(12) United States Patent
Frey et al.

(10) Patent No.: US 6,249,097 B1
(45) Date of Patent: Jun. 19, 2001

(54) OPTIMUM MOTOR SPEED CONTROL SYSTEM

(75) Inventors: Mark Frey, Mason; Saed M. Mubaslat, Miamisburg; Karen M. Pirrallo; Kevin A. Wolff, both of Dayton, all of OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/340,801

(22) Filed: Jun. 28, 1999

Related U.S. Application Data

(63) Continuation-in-part of application No. 08/976,281, filed on Nov. 21, 1997, now Pat. No. 5,917,296.

(51) Int. Cl.⁷ ...................................................... H02P 5/17
(52) U.S. Cl. .......................... 318/257; 318/432; 318/266
(58) Field of Search ..................... 318/255, 256, 318/257, 264, 265, 266, 268, 272, 280, 286, 434, 466, 467, 468, 469, 432; 388/903

(56) References Cited

U.S. PATENT DOCUMENTS

| | | | |
|---|---|---|---|
| Re. 36,454 | * 12/1999 | Ball et al. ............................... | 322/23 |
| 4,156,162 | * 5/1979 | Warfield et al. ...................... | 318/434 |
| 4,268,781 | * 5/1981 | Kawada et al. ....................... | 318/434 |
| 4,614,903 | 9/1986 | Betsch et al. . | |
| 4,775,823 | 10/1988 | Yoshida et al. . | |
| 5,151,637 | 9/1992 | Takada et al. . | |
| 5,341,454 | * 8/1994 | Orii ....................................... | 388/815 |
| 5,568,031 | 10/1996 | Jinbo et al. . | |
| 5,627,440 | 5/1997 | Yamamoto et al. . | |
| 5,801,501 | * 9/1998 | Redelberger ......................... | 318/283 |
| 5,857,061 | * 1/1999 | Chang et al. ......................... | 388/829 |

FOREIGN PATENT DOCUMENTS

| | | |
|---|---|---|
| 197 30 047 A1 | 1/1999 | (DE) . |
| 0 187 864 A1 | 7/1986 | (EP) . |
| 0 704 781 A2 | 4/1996 | (EP) . |
| 61-231887 | 10/1986 | (JP) . |

* cited by examiner

*Primary Examiner*—Bentsu Ro
(74) *Attorney, Agent, or Firm*—Jacox, Meckstroth & Jenkins

(57) ABSTRACT

The method for controlling a motor driving a load holds the speed of the output shaft of the motor substantially constant as the torque imposed upon the shaft by the load varies, then regulates the rate of change of the output torque delivered by the motor's output shaft based on the sensed value of output torque as the motor's speed decreases.

11 Claims, 5 Drawing Sheets

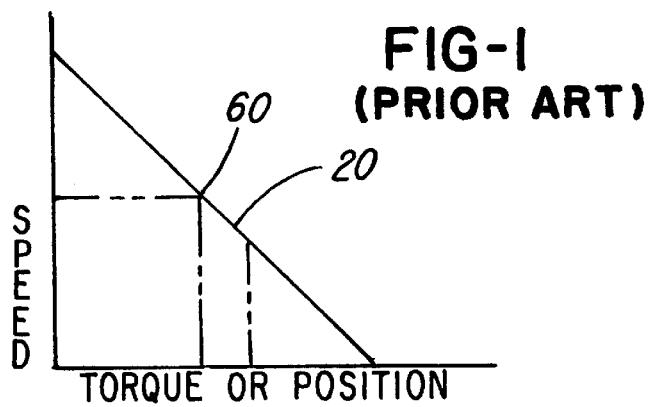
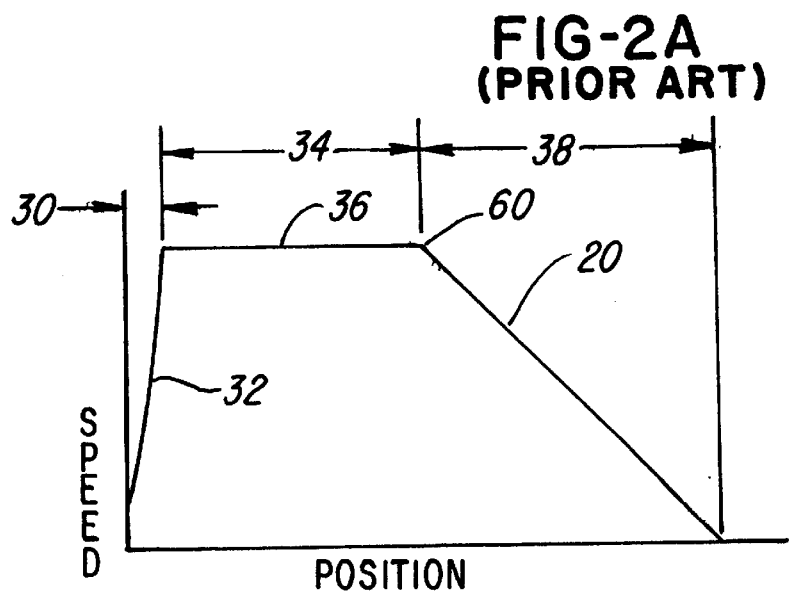
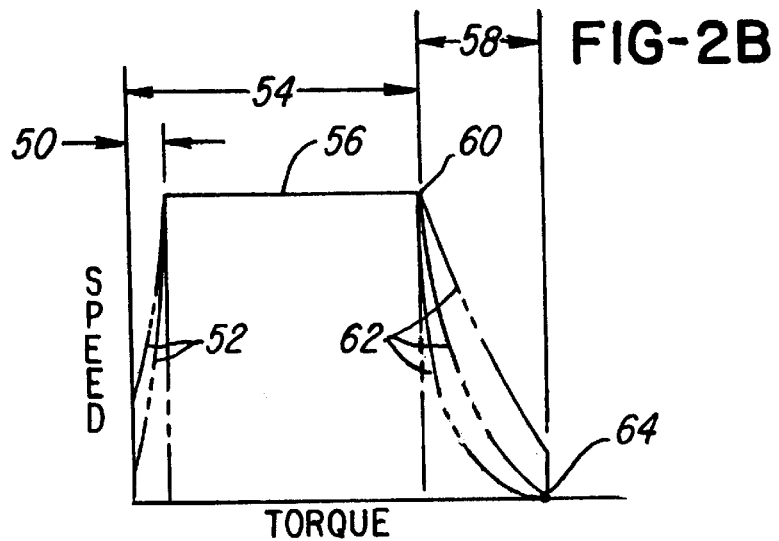

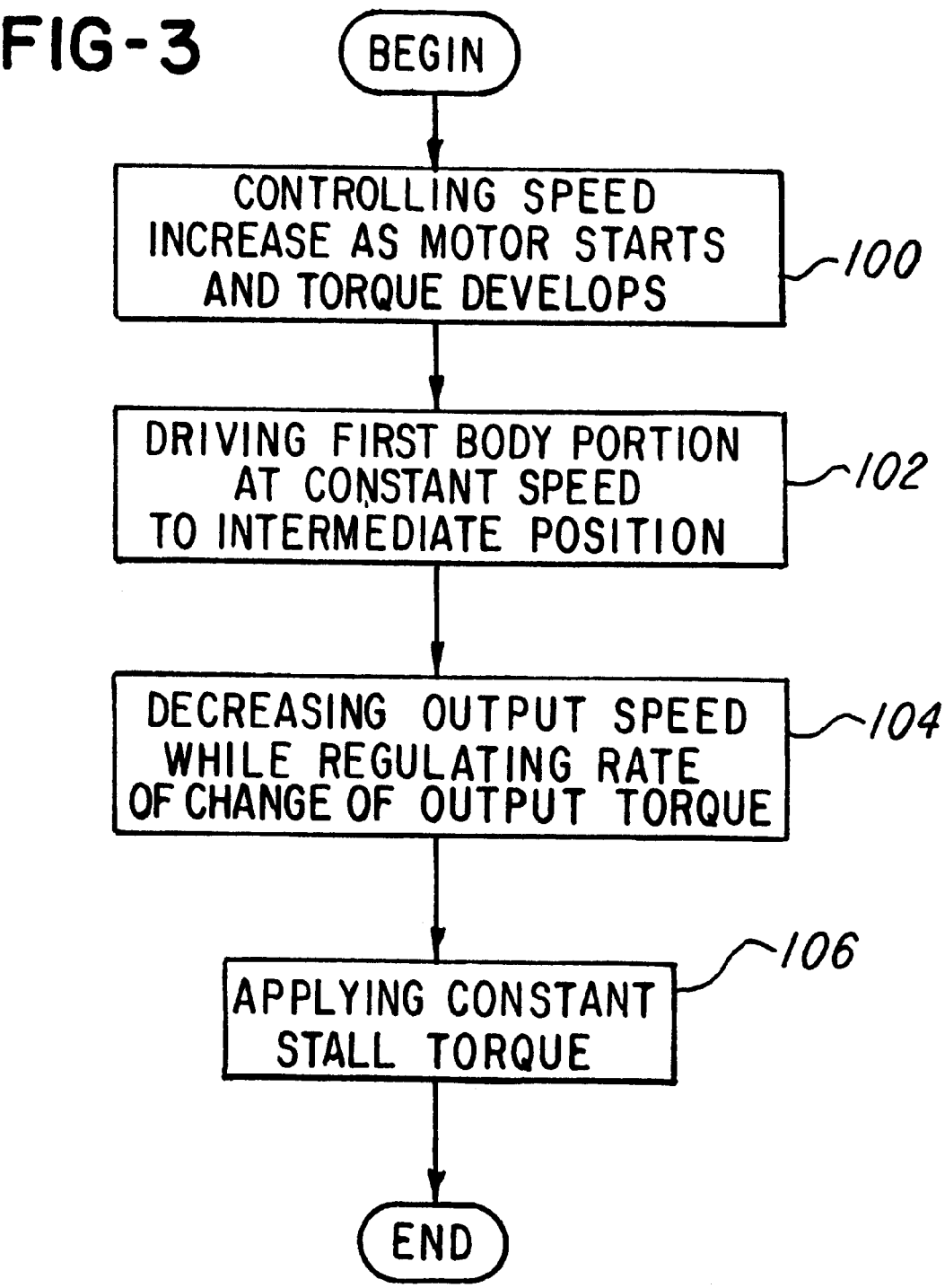

OPTIMUM MOTOR SPEED CONTROL SYSTEM

CROSS-REFERENCE

This application is a continuation-in-part of patent application Ser. No. 08/976,281 filed on Nov. 21, 1997, now U.S. Pat. No. 5,917,296.

FIELD OF THE INVENTION

The invention relates to a method and a system for controlling the speed of a motor's output shaft as the torque or force imposed upon the shaft by the load being driven by the motor varies, and for controlling the output torque delivered by the shaft as the motor's speed drops to zero based upon the sensed output torque. This invention can be used to control an electric motor in a powered system of a motor vehicle.

BACKGROUND OF THE INVENTION

Many powered systems in motorized vehicles are controlled by permanent magnet electric motors. Examples include window lifts, sunroofs, sliding van doors, vehicle trunks, tailgates, and seat and seat back recliners and adjusters. The variability of certain parameters in many powered systems (e.g., the supply voltage, operating temperature, and the load driven by the motor) produces a variable speed vs. torque performance characteristic in the permanent magnetic electric motor used to power such a system, leading to undesirable variation in the powered systems' travel time, noise level, and sealing force. A control method and system is needed for optimizing the speed vs. torque performance characteristic of motors that drive powered systems in motor vehicles notwithstanding the variability of operating parameters in these systems.

SUMMARY OF THE INVENTION

The inventive method for controlling a motor driving a load is comprised of two phases. In the first phase, the speed of the motor's output shaft is held substantially constant as the torque imposed upon the output shaft by the load, and, therefore, the output torque of the motor, varies. In the second phase, the torque delivered by the motor's output shaft is controlled in a predetermined manner as the speed of the output shaft drops to zero.

The inventive method may be applied in an automotive or motor vehicle setting to any motor that drives a traveling component in a powered system. In the first phase of the inventive method, a traveling component is driven by the motor at a constant speed to some intermediate position. During this first phase, the output speed of the motor is held constant regardless of variations in operating environment parameters. In a second phase as the traveling component moves from the intermediate position to a second position, the output speed of the motor is continuously decreased and the output torque delivered by the motor's output shaft is controlled.

BRIEF DESCRIPTION OF THE DRAWINGS

FIG. 1 is a graph depicting the uncontrolled speed vs. load and output torque performance curve of a permanent magnet electric motor.

FIG. 2A is a graph depicting the speed vs. position performance curve of a motor with open-loop speed control.

FIG. 2B is a graph depicting the speed vs. output torque performance curve of a motor with closed-loop control according to the present invention.

FIG. 3 is a flow chart outlining the closed-loop motor control method of the present invention.

DETAILED DESCRIPTION OF THE PREFERRED EMBODIMENT

Figure 4:
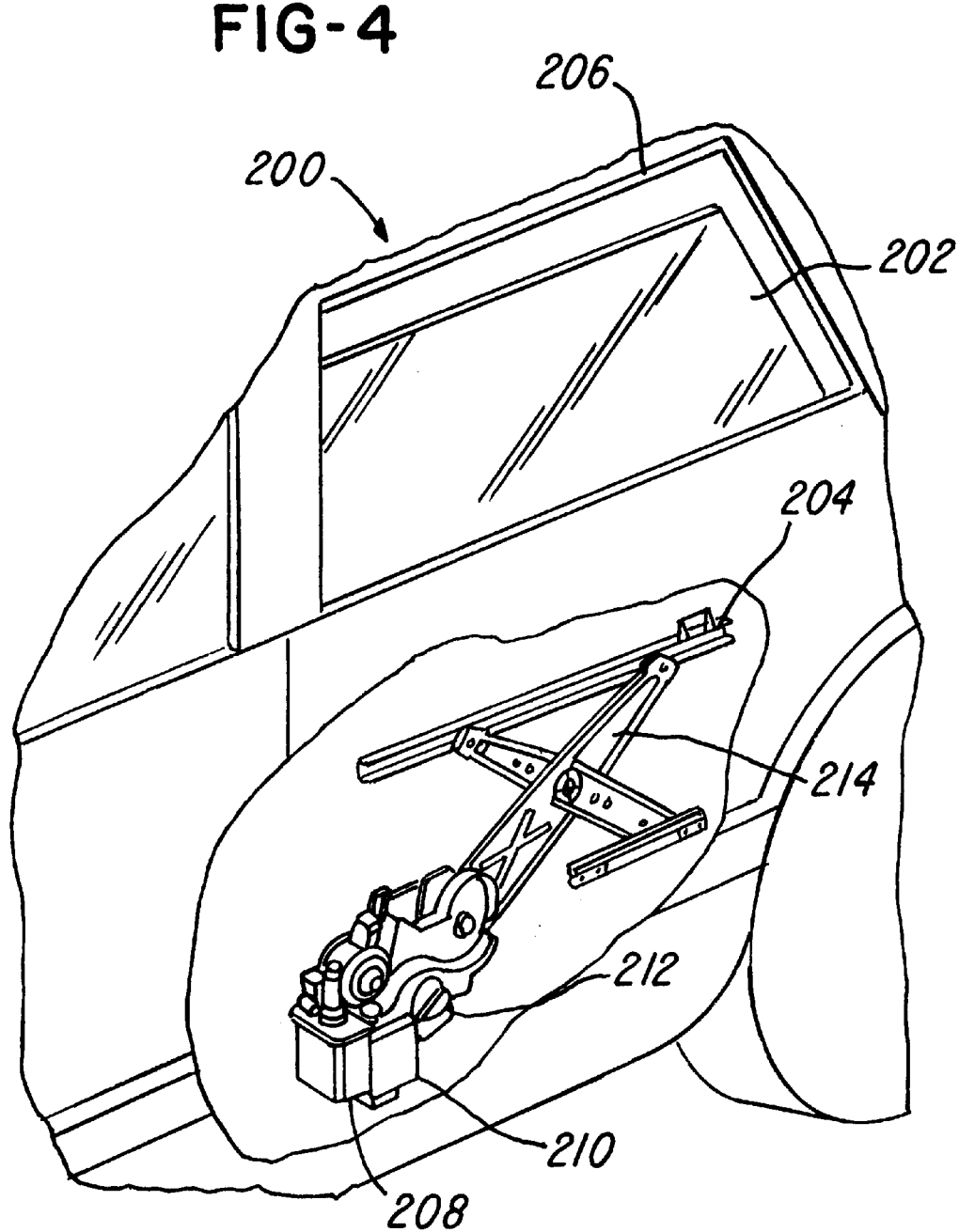
FIG. 4 is a perspective view of one of many applications of the present motor control method, a powered window lift system in an automotive vehicle.

Referring now to the drawings in which each numeral represents the same component among the several views, FIG. 1 depicts the speed vs. torque performance curve 20 of a typical permanent magnet electric motor with no control. The revolutions per minute or speed of the motor's output shaft is shown as a function of the input torque imposed on the motor's output shaft by the load driven by the motor. As the load torque increases the motor's speed decreases linearly.

Powered automotive systems have employed open-loop speed control schemes in which the output speed of the motor is permitted to vary in accordance with an inherent characteristic of the automotive system. In such systems a motor with a speed vs. torque performance curve of FIG. 1 may be used to drive a component in a powered automotive system, such as a powered door or a wind screen wiper blade, whose position may be directly related to the output torque delivered by the motor. As an example, FIG. 2A shows a performance curve for such a system in which the speed of the motor varies as a function of the position of the door or the wiper blade. As the speed and the output torque of the motor begin to increase in region 30, the component slowly begins to change position as reflected by curve 32. In region 34, the component begins to travel under open-loop control, in which the speed of the motor may be limited, for example, by the value of a resistor or a group of resistors in the motor's control circuit. The commanded speed of the motor and its change in position, which is directly related to the travel of the automotive component, is reflected in FIG. 2A by a straight, horizontal line 36. However, because there is no verification of the motor's output speed in open-loop motor control, the motor's actual output speed may not be constant. In region 38 of FIG. 2A at point 60, the speed and position of the motor begins to fall off along curve 20 in accordance with the motor's speed vs. torque performance curve of FIG. 1.

Powered automotive systems that employ no motor control scheme, as shown in FIG. 1, as well as those that employ an open-loop motor control scheme, as shown in FIG. 2A, experience uneven output torque as a result of variations in certain operating parameters, for example, variability in the load imposed on the motor, in the operating temperature of the motor, and in the voltage supplied to the motor. As a result this variability, use of an uncontrolled or an open-loop controlled motor in an powered system of an automobile disadvantageously leads to variation in the powered system's travel time, noise level, and sealing force.

The speed vs. output torque performance characteristic for the motor of FIG. 1 operating under closed loop control according to the present method is shown in FIG. 2B. The multiple curves 52 in region 50 of FIG. 2B depict various paths for controlling the large increase in the motor's output speed as the motor is started and begins to develop output torque. Controlling the motor's speed in region 50 reduces the impact load on the components in the powered system that are being actuated by the motor and on the mechanical components of the motor itself as the tolerances in the motor and in the powered system's mechanisms are taken up at startup. The preferred embodiment of the invention controls the output speed of the motor in region 50 using a closed-loop control scheme in which the output speed is fed back as an input control parameter to regulate the output speed of the motor.

The segment of the operating curve 56 in region 54 of FIG. 2B reflects a closed-loop control scheme in which the motor's output speed is held constant at a medium value as the load torque and, therefore, the output torque required to drive the load, increases. The preferred embodiment of the invention controls the output speed of the motor in region 54 using a closed-loop control scheme in which the output speed is fed back as an input control parameter to regulate the output speed of the motor. This uniformity in speed promotes constant travel times, smooth performance of the powered system's sealing components, and reduces undesirable system noise variations.

The multiple curves 62 in region 58 of FIG. 2B depict various paths for controlling the decrease in the motor's speed and regulating the increase motor's output torque at the end of the travel of the traveling component in the powered system. Point 60 on the control curve of FIG. 2B corresponds to point 60 on the uncontrolled open-loop performance characteristic of curve 20 in FIG. 1. The preferred embodiment of the invention controls the output torque of the motor in region 58 along any one of the possible curves 62 using a closed-loop control scheme in which the output torque is fed back as an input control parameter to regulate the output speed of the motor. The closed-loop control method of the present invention represented by control curves 62 effects a soft stop for the traveling component as the motor's output speed drops to zero. Such a control scheme minimizes impact loads on the powered system's closure mechanism as it reaches the end of its travel and on the mechanical components of the motor itself.

At the end of the travel control curve 62 for the traveling component, the control method of the present invention applies a constant stall torque 64. The stall torque 64 holds the amount of force applied to the powered system's mechanism through the motor to a known value regardless of variations in the operating environment parameters.

FIG. 3 outlines the control method of the present invention depicted in FIG. 2B. In step 100, the output speed of the motor is controlled along one of the control paths 52 in region 50 as the motor is started and begins to develop torque. In the preferred embodiment of the present invention, the motor's output speed is controlled along one of the control paths 52 based on the motor's sensed output speed, which is used as a regulating input parameter by feeding it back in a closed-loop. In step 102, the motor's output speed is held constant along curve 56 throughout the region 54 regardless of any increase in the motor's torque under the load up to point 60 as the motor drives the traveling component in the powered system at a constant speed to an intermediate position near the end of its predetermined travel path. In the preferred embodiment of the present invention, the motor's output speed is controlled along curve 56 based on the motor's output speed itself, which is again used as a regulating input parameter by feeding it back in a closed-loop.

In step 104, the motor's speed is decreased along one of the curves 62 in region 58 as the traveling component moves from its intermediate position to its final position on the travel path. The speed is decreased along path 62 as the rate of change of the output torque is regulated and minimized throughout region 58 as the traveling component nears the end of its travel path. In the preferred embodiment of the present invention, the motor's output torque is controlled along one of the paths 62 based on the motor's output torque itself, which is used as a regulating input parameter by feeding it back in a closed-loop. At point 64 a constant-valued stall torque is applied at a position very near the end of the powered system's travel to effect a soft positive stop for the traveling and/or sealing components of the powered system.

The control method outlined in FIG. 3 advantageously eliminates variations in closure time between multiple powered systems of the same vehicle. For example, if all windows in a vehicle are in the fully open position and are commanded to close at the same time, the method of FIG. 3 ensures that they will close simultaneously, thus improving sound quality in the vehicle by reducing variation between the moving systems. Reducing motor speed 62 in region 58 as the powered system approaches the end of its travel and seating the sealing components with a constant stall torque 64 limits impact forces on the powered system and on the motor itself. In addition, powered systems may be optimized for a narrower range of forces, which reduces design and system costs.

Figure 5:
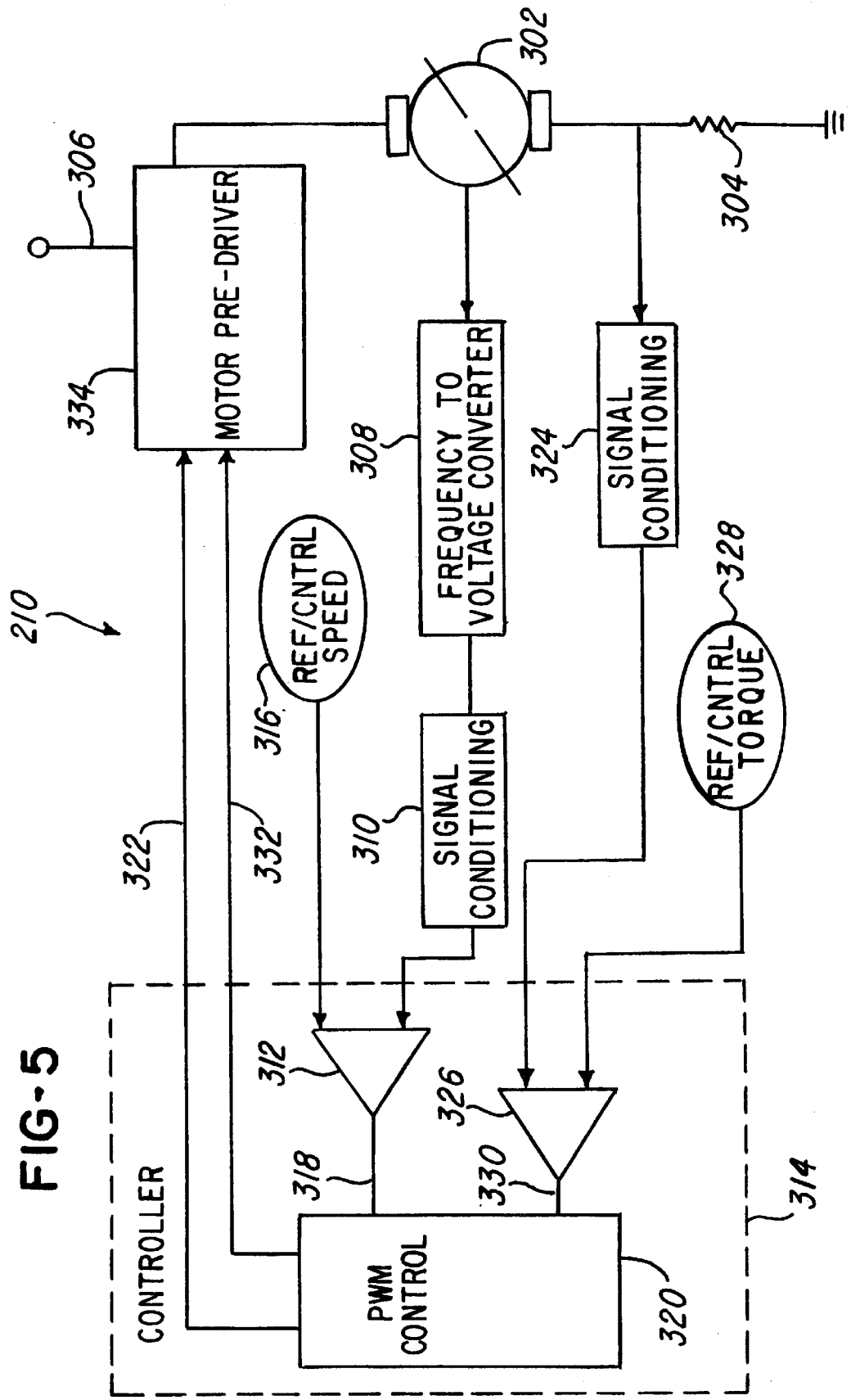
FIG. 5 is a functional block diagram depicting one of many analog electronic configurations of the motor controller for the window lift system of FIG. 4.
Figure 6:
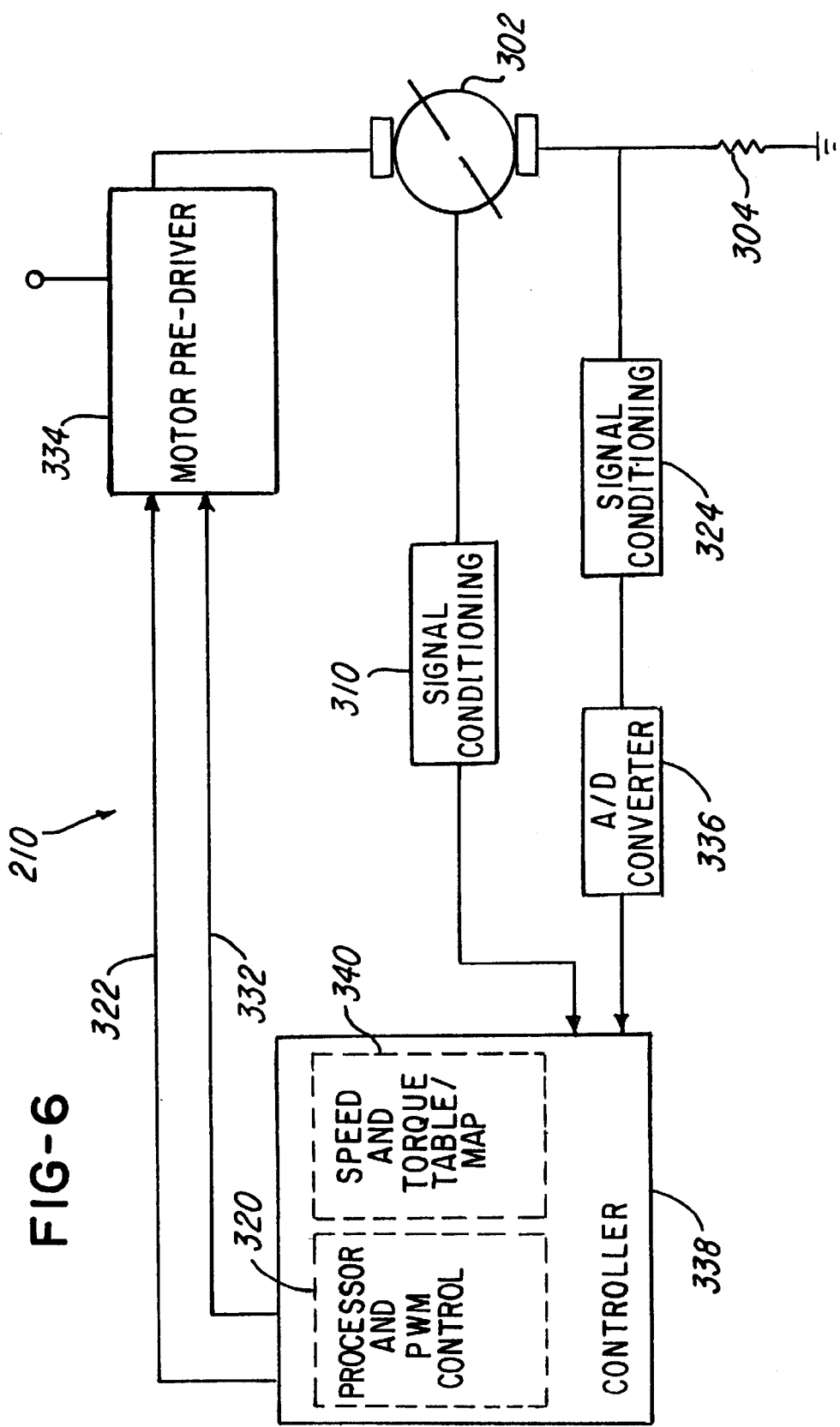
FIG. 6 is a functional block diagram depicting one of many digital electronic configurations of the motor controller for the window lift system of FIG. 4.

FIGS. 4, 5 and 6 illustrate the motor control method of the present invention applied to a powered window lift system 200 in an automotive vehicle. Referring now to FIG. 4, the powered lift system 200 includes a window 202 attached to a sash 204 that travels upward to seat the window 202 against a seal 206. A permanent magnet electric motor 208 controlled by electronics 210 operates a gear sector 212 that causes translation of regulator cross arms 214 attached to the sash 204. The extended and compressed positions of the regulator cross arms 214 define the open and closed positions of the window 202.

FIGS. 5 and 6 functionally depict two of the many possible motor controllers 210, which may be implemented physically using discrete hardware components or a combination of hardware and software with a microprocessor. In FIG. 5, a velocity sensor 302 provides digital data regarding the revolutions per minute or speed of the motor's 208 output shaft. A current sensor 304 positioned between the bus voltage 306 and ground provides analog data regarding the current flowing through the motor, from which the motor's output torque value is derived.

The digital output from the velocity sensor 302 is converted to the frequency domain 308 and conditioned 310 to improve its signal quality then compared 312 within the controller 314 to an external adjustable and programmable reference control speed value 316. Developing a reference value may be accomplished by any of the implementations well known in the art. For example, a multi-turn potentiometer or a resistive network attached to the motor shaft may be used to vary the output voltage as a function of the rotor or "window" position. A programmed EPROM or an independent processor could also be used, as well as distributing sensors along the path of the window guides, or providing analog multi-segment piece-wise linear curves or wave synthesizers.

The digital result 318 of the comparison 312 is supplied to a processor and pulsewidth modulation (PWM) control module 320 to determine the duty cycle of the motor control signal that will yield the performance curve of FIG. 2B. This motor control signal is transmitted by the controller 314 via the PWM speed control bus 322 to a motor pre-driver that regulates the speed of the motor. The controller 314 may also be implemented logically using discrete component circuits.

In a similar fashion, output from the current sensor 304 is conditioned 324 to improve its signal quality then compared 326 to an external adjustable and programmable reference or control torque value 328. The digital result 330 is supplied to the PWM control module 320 to determine the duty cycle of the motor control signal that will yield the performance curve of FIG. 2B. This motor control signal is transmitted by the controller 314 via the PWM torque control bus 332 to the motor pre-driver 334 that also regulates the output torque of the motor.

FIG. 6 depicts a one of the many alternate implementations of the motor controller 210. The analog output from the current sensor 304 is conditioned the converted from the analog to the digital domain 336 then, together with the conditioned digital output from the velocity sensor 302, compared within controller 338 against a programmed speed vs. torque table or map 340 that charts the desired speed or torque to implement the performance curve of FIG. 2B. As in FIG. 5, a compare algorithm within processor and PMW control module 320 determines the duty cycle for the motor control signals required to control the motor in such a way as to yield the performance curve of FIG. 2B. For example, the duty cycle may be increased if the motor speed or torque falls below the desired value, or decreased if the motor's speed or torque tends to exceed the desired value at any point on the performance curve of FIG. 2B.

A designer may choose the implementation of FIG. 5 or 6 depending on several factors such as complexity and calculation power of available processor and PWM modules 320, software memory requirements, bandwidth resolution of the PWM channels and the clarity of the motor control signals transmitted via control buses 322 and 332.

The present inventive method for controlling the output speed and torque of a motor has been illustrated in the context of only one of many possible applications, i.e., controlling a permanent magnet electric motor that drives a powered system in a motor vechicle. Alternative and minor variations of the invention that are apparent to those skilled in the art may still fall within the scope of the claims, which follow.

We claim:

1. A method for controlling a motor driving a load, comprising the steps of:
   holding the speed of revolution of the output shaft of said motor at a substantially constant first speed as the load torque imposed upon said output shaft by said load varies;
   regulating the output torque delivered by said output shaft based on the sensed output torque value of said output shaft as said speed decreases from said first constant speed;
   applying a constant-valued stall torque to said output shaft at a position near an end of travel of said load to effect a soft stop of said load.

2. The method of claim 1, further comprising the step of:
   maintaining at a predetermined minimum speed of said motor a predetermined value of said output torque for a predetermined time interval.

3. The method of claim 1, further comprising the step of:
   increasing said speed to said first constant speed while regulating said speed based on the sensed value of said speed.

4. The method of claim 1, further comprising the step of:
   after said speed has decreased to substantially zero, re-energizing said motor.

5. A method for controlling a motor driving a load, comprising the steps of:
   increasing the speed of revolution of the output shaft of said motor to a first constant speed while regulating said speed based on the sensed value of said speed;
   holding said speed at substantially said first constant speed as that load torque imposed upon said output shaft by said load varies;
   regulating the output torque delivered by said output shaft based on the sensed output torque value of said output shaft as said speed decreases;
   maintaining at a predetermined minimum speed a predetermined value of said output torque for a predetermined time interval;
   applying a constant-valued stall torque to said output shaft at a position near an end of travel of said load to effect a soft stop of said load; and
   after said speed has decreased to substantially zero, re-energizing said motor.

6. A method for controlling a motor that drives a traveling component in a powered system of a motor vehicle relative to a second component, comprising the steps of:
   maintaining a substantially constant speed of revolution of the output shaft of said motor based on a sensed revolution speed value of said output shaft as said traveling component moves from first position to an intermediate position;
   regulating the rate of change of the output torque of said output shaft based on a sensed output torque value while said speed of revolution changes; and
   applying a constant-valued stall torque to said output shaft at a second position near an end of travel of said load to effect a soft stop of said load.

7. The method of claim 6, further comprising the step of:
   maintaining at said second position a predetermined value of said output torque for a predetermined time interval.

8. The method of claim 6, further comprising the step of:
   increasing said speed of revolution to said constant speed at said first position based upon said sensed revolution speed value as said traveling component reaches said first position.

9. The method of claim 6, further comprising the step of:
   after said speed has decreased to substantially zero, re-energizing said motor to drive said traveling component toward said first position.

10. A method for controlling a motor that drives a traveling component in a powered system of a motor vehicle relative to a second component, comprising the steps of:
    increasing the speed of revolution of the output shaft of said motor to a first constant speed based upon a sensed revolution speed value as said traveling component reaches a first position;
    maintaining a substantially constant speed of revolution of said output shaft of said motor based upon said sensed revolution speed value as said traveling component moves from said first position to an intermediate position;
    regulating the rate of change of said output torque of said output shaft based upon a sensed torque output value while said traveling component moves from said intermediate position to a second position;
    maintaining at said second position a predetermined value of said output torque for a predetermined time interval; and after said speed of revolution has decreased to substantially zero, re-energizing said motor to drive said traveling component toward said first position.

11. A method for controlling the movement of a traveling system component in a motor vehicle relative to a second system component along a predetermined path having an initial position, an intermediate position, and a final position, comprising the steps of:

providing a motor to drive said traveling system component relative to said second system component along said predetermined path;

increasing said motor's speed to a constant speed based upon the actual speed of said motor to drive said traveling system component to said initial position;

driving said traveling system component at said constant speed from said initial position to said intermediate position while regulating said speed;

decreasing at said intermediate position, said constant speed while regulating said output torque until said traveling system component reaches said final position;

maintaining at said final position a predetermined output torque for a predetermined time interval; and after said motor's speed has dropped to substantially zero, re-energizing said motor to drive said first system component toward said initial position.

* * * * *